(12) United States Patent
Hakim

(10) Patent No.: US 12,141,653 B2
(45) Date of Patent: *Nov. 12, 2024

(54) SYSTEMS FOR AUTHENTICATION AND RELATED DEVICES AND METHODS

(71) Applicant: EllansaLabs Inc., Addison, TX (US)

(72) Inventor: Omar Besim Hakim, Addison, TX (US)

(73) Assignee: Ellansalabs Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,104

(22) Filed: Aug. 30, 2023

(65) Prior Publication Data

US 2023/0409855 A1 Dec. 21, 2023

Related U.S. Application Data

(63) Continuation of application No. 18/160,729, filed on Jan. 27, 2023, now Pat. No. 11,783,145.

(60) Provisional application No. 63/434,242, filed on Dec. 21, 2022.

(51) Int. Cl.
| | |
|---|---|
| *G06K 7/14* | (2006.01) |
| *A44C 17/00* | (2006.01) |
| *B23K 26/00* | (2014.01) |
| *B23K 26/362* | (2014.01) |
| *G01N 21/87* | (2006.01) |

(52) U.S. Cl.
CPC ............ *G06K 7/1417* (2013.01); *A44C 17/00* (2013.01); *B23K 26/0006* (2013.01); *B23K 26/362* (2013.01); *G06K 7/1413* (2013.01); *G01N 21/87* (2013.01)

(58) Field of Classification Search
CPC .... G06K 7/1417; G06K 7/1413; A44C 17/00; A44C 17/001; B23K 26/006; B23K 26/362; G01N 21/87

See application file for complete search history.

(56) References Cited

U.S. PATENT DOCUMENTS

| | | | |
|---|---|---|---|
| 4,809,417 | A | 3/1989 | Normann, Jr. |
| 5,714,102 | A | 2/1998 | Highum |
| 5,753,887 | A | 5/1998 | Rosenwasser et al. |
| 5,760,367 | A | 6/1998 | Rosenwasser |
| 7,204,428 | B2 | 4/2007 | Wilson |
| 7,284,396 | B2 | 10/2007 | Barron et al. |
| 7,537,877 | B2 | 5/2009 | Yoshiba et al. |
| 7,773,749 | B1 | 8/2010 | Durst et al. |

(Continued)

FOREIGN PATENT DOCUMENTS

| | | |
|---|---|---|
| AU | 2006246300 A1 | 11/2006 |
| BR | PI0906398-6 A2 | 8/2011 |

(Continued)

OTHER PUBLICATIONS

Bharadwaj et al., "Femtosecond laser written photonic and microfluidic circuits in diamond," J. Phys.: Photonics 1, 2019.

(Continued)

*Primary Examiner* — Matthew Mikels
(74) *Attorney, Agent, or Firm* — Dickinson Wright PLLC

(57) ABSTRACT

A gemstone including: a table defining a first area; a culet defining a second area with a size equal to a size of the first area; and a scanable indicia positioned in the gemstone between the table and the culet.

8 Claims, 7 Drawing Sheets

(56) References Cited

U.S. PATENT DOCUMENTS

| | | | |
|---|---|---|---|
| 8,851,372 | B2 | 10/2014 | Zhou et al. |
| 9,239,414 | B2 | 1/2016 | Rey et al. |
| 9,269,576 | B2 | 2/2016 | Yamauchi et al. |
| 10,281,398 | B2 | 5/2019 | Zheng et al. |
| 10,471,478 | B2 | 11/2019 | Gil |
| 10,603,685 | B2 | 3/2020 | Zheng et al. |
| 10,620,121 | B2 | 4/2020 | Zheng et al. |
| 11,074,650 | B1 | 7/2021 | Madisetti |
| 11,484,011 | B2 | 11/2022 | Chapman |
| 11,488,122 | B2 | 11/2022 | Diamond et al. |
| 11,514,689 | B2 | 11/2022 | Niskanen |
| 11,783,145 | B2 * | 10/2023 | Hakim ............... A44C 17/00 235/454 |
| 2003/0120613 | A1 | 6/2003 | Neogi |
| 2003/0223054 | A1 | 12/2003 | Warwick |
| 2004/0112087 | A1 | 6/2004 | Bishop |
| 2004/0121070 | A1 | 6/2004 | Xu et al. |
| 2005/0121417 | A1* | 6/2005 | Dixon ............... A61F 2/30767 216/88 |
| 2006/0196858 | A1 | 9/2006 | Barron et al. |
| 2008/0115212 | A1 | 5/2008 | Arias et al. |
| 2010/0018955 | A1 | 1/2010 | Martinez |
| 2010/0310839 | A1 | 12/2010 | Rey et al. |
| 2012/0120465 | A1 | 5/2012 | Martinez et al. |
| 2012/0167210 | A1 | 6/2012 | Oro Garcia et al. |
| 2013/0160639 | A1 | 6/2013 | Lee |
| 2014/0139608 | A1 | 5/2014 | Rosario et al. |
| 2015/0084193 | A1 | 3/2015 | Feng et al. |
| 2015/0213734 | A1 | 7/2015 | Glickman |
| 2016/0099852 | A1 | 4/2016 | Cook et al. |
| 2016/0232432 | A1 | 8/2016 | Regev |
| 2017/0009376 | A1 | 1/2017 | Khan et al. |
| 2017/0196318 | A1 | 7/2017 | Wagner |
| 2017/0261855 | A1 | 9/2017 | Moore et al. |
| 2018/0109494 | A1 | 4/2018 | Yu et al. |
| 2018/0293474 | A1 | 10/2018 | Almog |
| 2018/0310677 | A1 | 11/2018 | Gloyer et al. |
| 2018/0365450 | A1 | 12/2018 | Cheng |
| 2019/0130100 | A1 | 5/2019 | Dymshits et al. |
| 2019/0169876 | A1 | 6/2019 | Hennessy et al. |
| 2019/0366475 | A1 | 12/2019 | Scarselli et al. |
| 2019/0378145 | A1 | 12/2019 | Mayer |
| 2020/0076786 | A1 | 3/2020 | Spivack et al. |
| 2020/0145454 | A1 | 5/2020 | Galliano et al. |
| 2020/0246681 | A1 | 8/2020 | Chen |
| 2021/0027447 | A1 | 1/2021 | Parikh et al. |
| 2021/0112930 | A1 | 4/2021 | Bonke |
| 2021/0158118 | A1* | 5/2021 | Benderly ............... G01N 21/87 |
| 2021/0235824 | A1 | 8/2021 | Damri |
| 2021/0287288 | A1 | 9/2021 | Madisetti et al. |
| 2021/0316401 | A1 | 10/2021 | Ionin et al. |
| 2021/0356402 | A1 | 11/2021 | Kerner et al. |
| 2021/0358004 | A1 | 11/2021 | Chang et al. |
| 2021/0374401 | A1 | 12/2021 | Navot et al. |
| 2021/0390531 | A1 | 12/2021 | Voorhees et al. |
| 2022/0254174 | A1 | 8/2022 | Hong |
| 2022/0255733 | A1 | 8/2022 | Hakim |
| 2022/0376896 | A1 | 11/2022 | Hakim |
| 2022/0394892 | A1 | 12/2022 | Han |
| 2023/0016065 | A1 | 1/2023 | Diamond |

FOREIGN PATENT DOCUMENTS

| | | |
|---|---|---|
| CN | 105539248 A | 5/2016 |
| CN | 107110788 A | 8/2017 |
| CN | 107480745 A | 12/2017 |
| CN | 109034324 A | 12/2018 |
| CN | 210579489 U | 5/2020 |
| CN | 112908147 A | 6/2021 |
| DE | 202017105345 U1 | 9/2017 |
| DE | 102019217511 A1 | 5/2021 |
| DE | 102020120669 A1 | 2/2022 |
| EP | 3305461 A1 | 4/2018 |
| EP | 3324176 A1 | 5/2018 |
| EP | 3671674 A1 | 6/2020 |
| EP | 3886031 A1 | 9/2021 |
| EP | 4102399 A1 | 12/2022 |
| FR | 3021325 A1 | 11/2015 |
| FR | 3084848 A1 | 2/2020 |
| JP | 2004086828 A | 3/2004 |
| JP | 2016022308 A | 2/2016 |
| KR | 100344886 B1 | 7/2002 |
| KR | 20050027336 A | 3/2005 |
| KR | 20090123356 A | 12/2009 |
| KR | 20100111665 A | 10/2010 |
| KR | 20130001757 A | 1/2013 |
| KR | 20130140404 A | 12/2013 |
| KR | 101476264 B1 | 12/2014 |
| KR | 101734534 B1 | 5/2017 |
| KR | 20170116509 A | 10/2017 |
| KR | 20190049187 A | 5/2019 |
| KR | 20190108435 A | 9/2019 |
| KR | 20190108441 A | 9/2019 |
| KR | 102052735 B1 | 12/2019 |
| KR | 102052736 B1 | 12/2019 |
| KR | 102060972 B1 | 12/2019 |
| KR | 20190139170 A | 12/2019 |
| KR | 20200015650 A | 2/2020 |
| KR | 20200054122 A | 5/2020 |
| KR | 20200060311 A | 5/2020 |
| KR | 20200065307 A | 6/2020 |
| KR | 20200071802 A | 6/2020 |
| KR | 20200095282 A | 8/2020 |
| KR | 102152449 B1 | 9/2020 |
| KR | 20200106140 A | 9/2020 |
| KR | 20200131196 A | 11/2020 |
| KR | 102207713 B1 | 1/2021 |
| KR | 20210005837 A | 1/2021 |
| KR | 20210005838 A | 1/2021 |
| KR | 20210015495 A | 2/2021 |
| KR | 102286977 B1 | 8/2021 |
| KR | 20210098900 A | 8/2021 |
| KR | 20220157369 A | 11/2022 |
| KR | 102473589 B1 | 12/2022 |
| RU | 2719611 C1 | 4/2020 |
| RU | 2750068 C1 | 6/2021 |
| WO | 2005027677 A2 | 3/2005 |
| WO | 2005052540 A2 | 6/2005 |
| WO | 2006119561 A1 | 11/2006 |
| WO | 2016124176 A1 | 8/2016 |
| WO | 2017208053 A1 | 12/2017 |
| WO | 2018045726 A1 | 3/2018 |
| WO | 2020130932 A1 | 6/2020 |
| WO | 2020161462 A1 | 8/2020 |
| WO | 2022040304 A1 | 2/2022 |
| WO | 2022243840 A1 | 11/2022 |
| WO | 2024051981 A1 | 3/2024 |

OTHER PUBLICATIONS

Sotillo et al., "Diamond photonics platform enabled by femtosecond laser writing," www.nature.com/scientificreports, published Oct. 17, 2016.

Coccia et al., "Femtosecond laser writing of integrated photonic circuits in diamond," EPJ Web of Conferences 255, 12006, 2021, https://doi.org/10.1051/epjconf/202125512006.

Sun et al., "High conductivity micro-wires in diamond following arbitrary paths," Applied Physics Letters 105, 231105, 2014, http://dx.doi.org/10.1063/1.4902998.

Bloomer et al., "A single-crystal diamond X-ray pixel detector with embedded graphitic electrodes," Journal of Synchrotron Radiation, vol. 27, Part 3, May 2020, pp. 599-607.

Salter, "Laser Engineering Nanocarbon Phases within Diamond for Science and Electronics," ACS Publications, ACS Nano 2024, 18, pp. 2861-2871, https://doi.org/10.1021/acsnano.3c07116.

Janssens et al., "Direct Laser Writing of Nanochannels Between Ultra-Thin Nanocrystalline Diamond Films and Glass Substrates," Okinawa Institute of Science and Technology, Graduate University, 2023 MRS Fall Meeting, presented Nov. 28, 2023.

Salter et al., Abstract, "Femtosecond Laser Writing Inside Diamond," University of Oxford, 2023 MRS Fall Meeting, presented Nov. 28, 2023.

(56) References Cited

OTHER PUBLICATIONS

Mendonca et al., "Direct Laser Writing for Diamond NV Centers Placement," University of Sao Paulo, 2023 MRS Fall Meeting, presented Nov. 28, 2023.

Laurent E. Cartier et al., "Laser Inscription and Marking of Gemstones An Overview of Options", InColorMagazine.com; Gemstone.org, International Colored Gemstone Association, Summer 2019, pp. 66-69.

Notification of Transmittal of the International Search Report and the Written Opinion of the International Searching Authority, or the Declaration dated Sep. 15, 2023 (Sep. 15, 2023), 9 pages, issued on related International Application PCT/US2023/061565 by the Korean Intellectual Property Office.

OPSYDIA.com; Securing the Identity of Diamonds, Mar. 2022 (downloaded Mar. 1, 2023).

International Search Report and Written Opinion for PCT Application No. PCT/US2024/031386 dated Jul. 23, 2024, 14 pages.

* cited by examiner

SYSTEMS FOR AUTHENTICATION AND RELATED DEVICES AND METHODS

CROSS-REFERENCE TO RELATED APPLICATION

The present disclosure is a continuation of Non-Provisional patent application Ser. No. 18/160,729, filed Jan. 27, 2023 and entitled "SYSTEMS FOR AUTHENTICATION AND RELATED DEVICES AND METHODS", which claim the benefit to Provisional Patent Application No. 63/434,242, filed on Dec. 21, 2022 and entitled "SYSTEMS FOR AUTHENTICATION AND RELATED DEVICES AND METHODS", the contents of which are incorporated by reference in their entirety.

TECHNICAL FIELD

The present specification generally relates to authentication devices for confirming authenticity of items and, more specifically, items having scanable indicia that indicate authenticity of the item.

BACKGROUND

Traditional gemstones are cut to maximize an amount of light that passes and is reflected through the gemstone, resulting in increased brightness and fire of the gemstone. The brightness and fire can be increased by increasing a number of facets in the gemstone, and by minimizing a size of a culet. Gemstones may also be inscribed with a marking to identify the gemstone. However, these markings are traditionally inscribed at a small size to make invisible without magnification of the marking. Generally, these markings require over 10× magnification to be seen so as to not affect the aesthetic of the gemstone. Accordingly, special equipment is necessary for a person to view the marking on the gemstone.

SUMMARY

In a first aspect, a gemstone includes: a table defining a first area; a culet defining a second area with a size equal to a size of the first area; and a scanable indicia positioned in the gemstone between the table and the culet.

In a second aspect, a gemstone includes: a first portion including a table; a second portion including a culet, the second portion is coupled to the first portion; and a scanable indicia is positioned between the table and the culet.

In a third aspect, a gemstone includes: a table defining a first area; a culet defining a second area with a size equal to a size of the first area; and a scanable indicia positioned in the gemstone between the table and the culet, the scanable indicia includes a plurality of individual data points that each have a width, the scanable indicia is spaced apart from a perimeter of the table to define a margin that is at least 4 times the width of one of the plurality of individual data points, and the scanable indicia has a width that is equal to or greater than 0.1 mm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
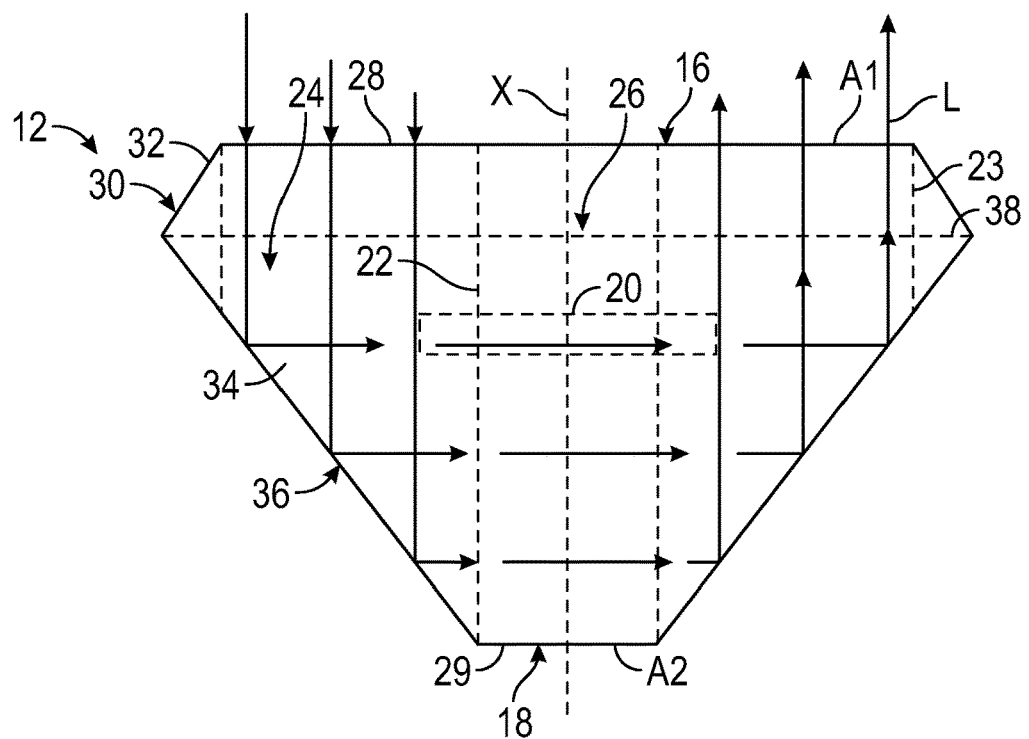
FIG. 1 depicts a side view of a gemstone with light passing therethrough, according to one or more embodiments shown and described herein.
Figure 2:
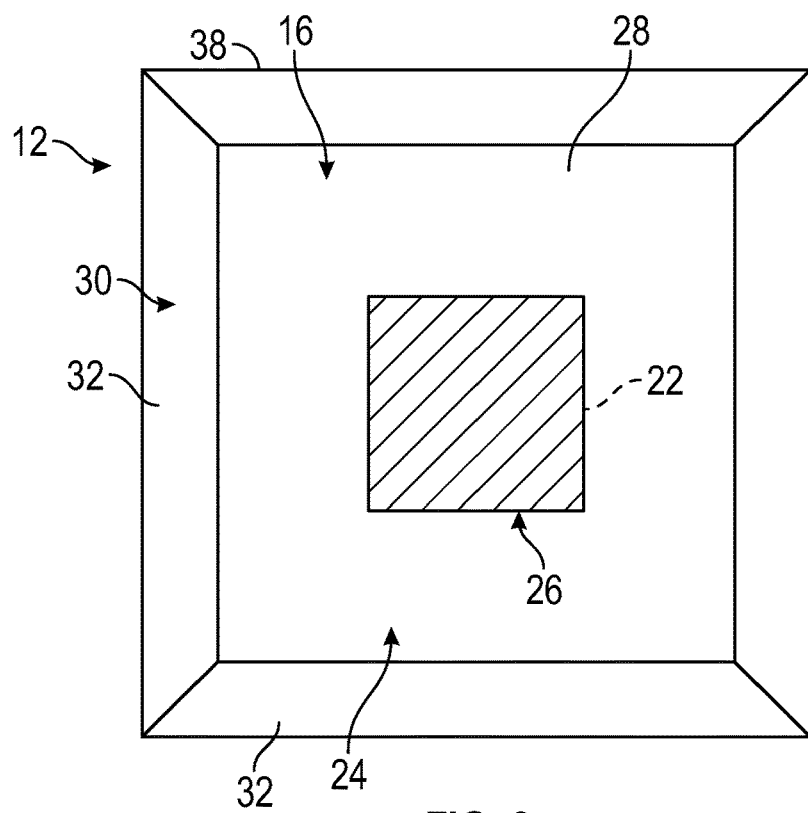
FIG. 2 depicts a top view of the gemstone of FIG. 1 having an illuminated portion and a nonilluminated portion, according to one or more embodiments shown and described herein.

FIGS. 1-7 generally depicts a system 10 (FIG. 6) and a method 100 (FIG. 7) for authenticating an item. The system 10 generally includes a gemstone 12 and a scanning device 14. Referring to FIGS. 1-5, the gemstone 12 may be any traditional gemstone 12 that can be etched or laser treated, such as a diamond, a sapphire, a ruby, an emerald, or the like. As used herein, a "gemstone" may refer to either of a lab-grown gemstone (e.g., formed in a lab), or a natural gemstone (e.g., formed in earth and obtained through mining). For further example, this may include a lab-grown diamond and/or a natural diamond.

The gemstone 12 may include a table 16, a culet 18 extending in parallel with the table 16, a girdle 38, a crown 30 extending from the table 16 to the girdle 38, a pavilion 36 extending from the girdle 38 to the culet 18, and an indicia 20. However, it is contemplated and possible that the gemstone 12 may be cut to include any combination of the above, or surfaces and portions in addition to the above. For example, a gemstone 12 as described herein may not include a culet 18. For further example, the gemstone 12 may be puck or wafer shaped having the table 16 and the culet 18 be the same or similarly sized and a single surface, such as the girdle 38, extending between the table 16 and the culet 18. Referring again to FIGS. 1-5, the culet 18 may extend substantially parallel to the table 16, where the table 16 may define an area A1 and the culet 18 may define an area A2. The crown 30 may extend obliquely to the table 16, and may extend from the table 16 to the girdle 38. The pavilion 36 may extend obliquely from the culet 18 to the girdle 38, with the girdle 38 disposed between the crown 30 and the pavilion 36. Each of the crown 30 and the pavilion 36 may include a plurality of facets 32, 34 that define a shape of the table 16 and the culet 18, such that the table 16 and the culet 18 may have a shape selected from one of an octagon, hexagon, pentagon, square, rectangle, circle and triangle. For example, the crown 30 may include four facets 32 such that the table 16 is shaped as a rectangle or a square. It is further contemplated and possible that the table 16 and/or culet 18 may have any operable shape for framing the indicia 20. The gemstone 12 may define an axis X extending through a geometric center of the gemstone 12 to extend substantially perpendicular through the table 16 and the culet 18.

As shown in FIG. 1, light L enters into the gemstone 12 through the table 16 to reflect off of the pavilion 36 on one side of the gemstone 12 to the pavilion 36 on the other side of the gemstone 12, and out through the table 16. This reflection of light L causes the gemstone 12 to appear bright (e.g., sparkle) when viewed. The trajectory of light L described above and shown in FIG. 1 is merely exemplary, such that the light L may pass through any portion of the gemstone 12 and reflect off of any of the pavilion 36, the crown 30, the girdle 38, the table 16, and the culet 18. When light L enters the table 16 along the axis X and through the table 16 at a location where an orthographic projection 22 of the area A2 intersects the table 16, the light L passes through the culet 18 without reflecting off the pavilion 36, thereby reducing the amount of light that passes out of the table 16. With the reduced light passing through the table 16, the gemstone 12 has an illuminated portion 24 and a nonilluminated portion 26 separate from the illuminated portion 24, the illuminated portion 24 having a greater brightness than a brightness of the nonilluminated portion 26. It is contemplated and possible that light may still pass through the nonilluminated portion 26, where the nonilluminated portion 26 is less bright than the illuminated portion 24. The nonilluminated portion 26 may be a volume of the gemstone 12 that intersects the orthographic projection 22 of the area A of the culet 18 along the axis X. In embodiments, the nonilluminated portion 26 may be the entire volume of the gemstone 12 that intersects the orthographic projection 22 of the area A of the culet 18 along the axis X.

Figure 3:
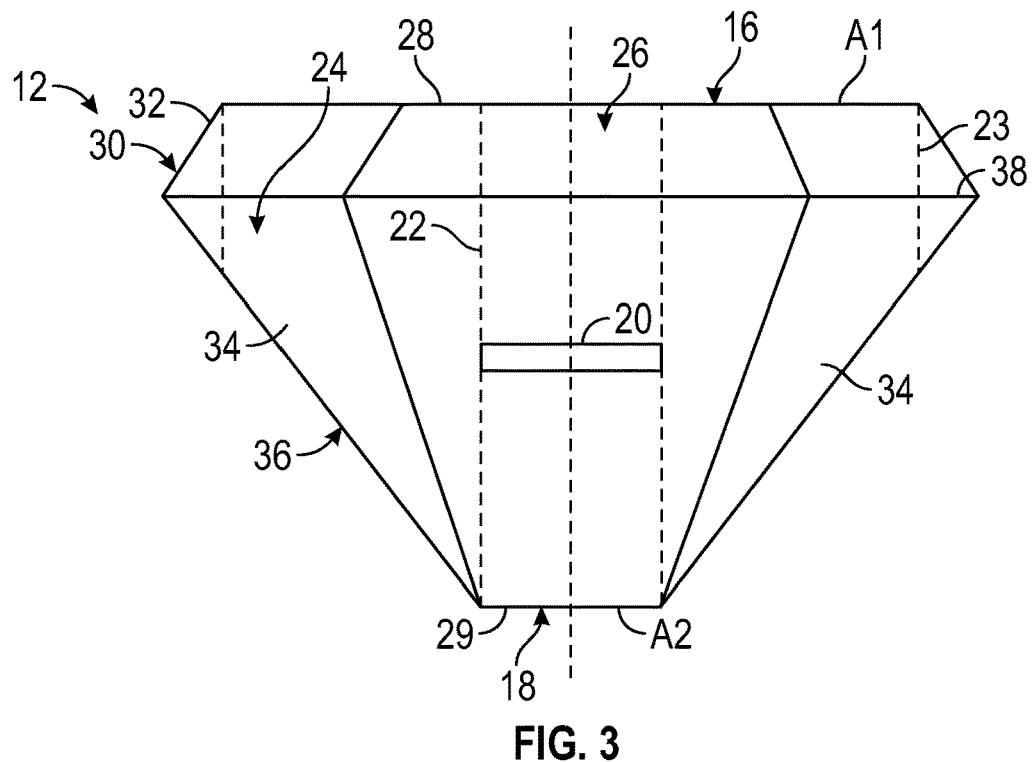
FIG. 3 depicts a side view of the gemstone of FIG. 1 having a scanable indicia etched therein, according to one or more embodiments shown and described herein.
Figure 4:
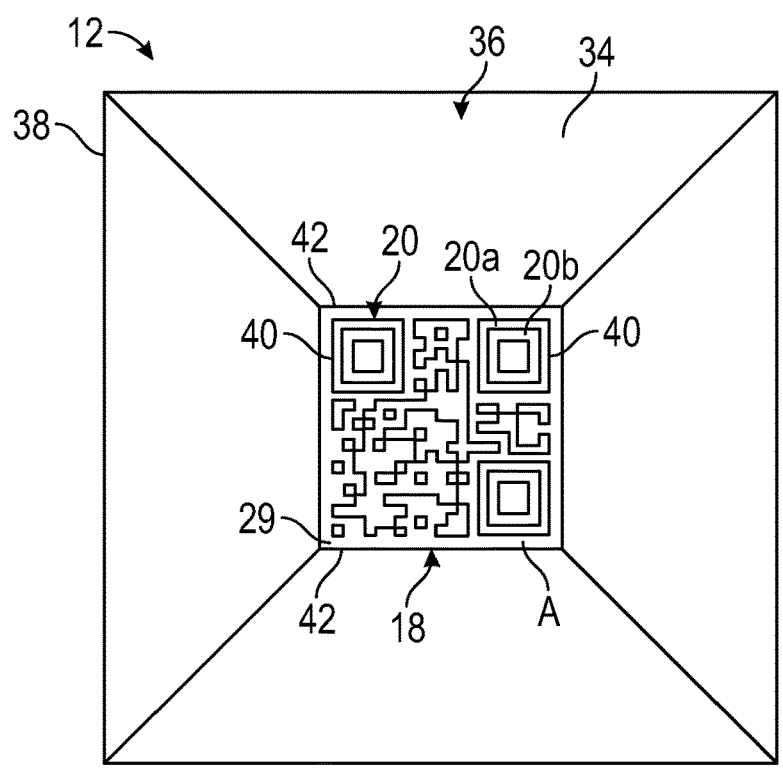
FIG. 4 depicts a bottom view of the gemstone of FIG. 3, according to one or more embodiments shown and described herein.
Figure 5:
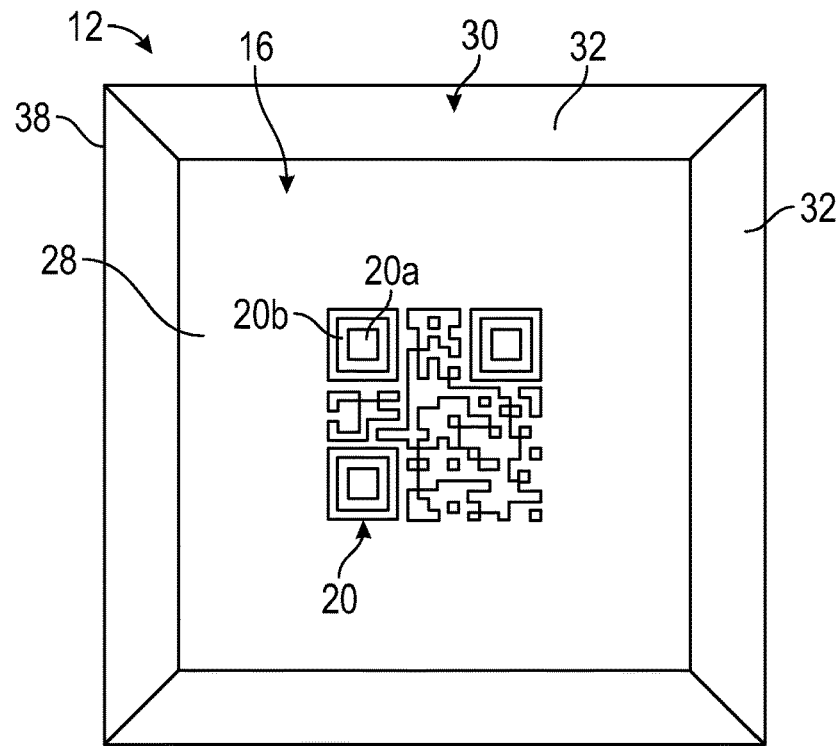
FIG. 5 depicts a top view of the gemstone of FIG. 3, according to one or more embodiments shown and described herein.

Referring to FIGS. 3-5, the indicia 20 may be a scanable indicia 20, such as a barcode (e.g., a QR code) or any other code that may be scanned to convey information. The indicia 20 may act as a means for conveying information when scanned by a scanning device. For example, a QR code may convey information, such as a web address, when scanned by the scanning device 14. The QR code may be any standard QR code, including micro QR codes. The QR code may conform to the QR code standards set out in https://en.wikipedia.org/wiki/QR_code and https://www.qrcode.com/en/codes/microqr.html, each of which are incorporated by reference in their entireties.

Barcodes, including QR codes, require contrast between the barcode and the medium that the barcode is positioned on. For example, the barcode may appear darker than the medium so that the barcode may be recognizable and/or scanable by a barcode scanner. Without contrast, the barcode may not properly be scanned by a scanner. The indicia 20 may be formed in the gemstone 12 at the nonilluminated portion 26, where the indicia 20 has a laser treated portion 20a (appears black) and an untreated portion 20b (appears white). The laser treated portion 20a is formed by laser treating a location within the gemstone 12 that turns the carbon atoms of the gemstone 12 into graphene, causing the laser treated portion 20a to appear darker than the untreated portion 20b. The darkness of the laser treated portion 20a creates a contrast with the untreated portion 20b of the gemstone 12, thereby forming the indicia 20 capable of being scanned by the scanning device 14. The laser treated portion 20a may include individual data points that each have a width. In the embodiments that the barcode is a QR code, the data points may be squares. The QR code may be sized relative to the table 16 to have a margin spacing the perimeter of the QR code from the perimeter of the table 16, where the margin is at least 4 times the width of the data point. The culet 18 may be sized to have a width that is equal to or greater than a width of the QR code. In embodiments where the culet 18 is circular, the width is equal to a diameter of the culet 18.

When positioned at the nonilluminated portion 26, the contrast between the laser treated portion 20a and the untreated portion 20b is increased, such that the laser treated portion is more visible. As discussed in further detail below, the indicia 20 may be formed at a position in the gemstone 12 such that light L reflecting off of the pavilion 36 may intersect the indicia 20 and reflect off of the indicia 20 to create further contrast between the laser treated portion 20a and the untreated portion 20b.

As depicted in FIG. 3, the indicia 20 may be formed in the gemstone 12 below a surface 28 of the table 16 and a surface 29 of the culet 18 to be positioned between the surface 28 of the table 16 and the surface 29 of the culet 18. The indicia 20 may be positioned below the girdle 38, between the girdle 38 and the culet 18. Alternatively, it is contemplated and possible that the indicia 20 is formed into the surface 28 of either of the table 16 or the surface 29 of the culet 18 to be positioned on one of the surfaces 28, 29. It is further contemplated and possible that the indicia 20 is formed on a surface of one gemstone 12 that is then fused with another gemstone 12 with the etching positioned between the gemstones, such that the etching is positioned between a table 16 and a culet 18 of a gemstone 12 that is formed by the two gemstones. The indicia 20 may be at least partially positioned within either or both of an orthographic projection 23 of area A1 extending along axis X and the orthographic projection 22 of the area A2 extending along the axis X, so that, when viewed along the axis X, the indicia 20 is positioned to overlap with the table 16 and the culet 18. When positioned in the nonilluminated portion 26 to overlap with the table 16 and the culet 18, the contrast between the laser treated portion 20a and the untreated portion 20b is increased as light reflected from the facets 32, 34 and pavilion 36 does not pass through the orthographic projection 22 of the area A along the axis X. Additionally, light L reflected from the facets 32, 34 and pavilion 36 passes through the orthographic projection 22 of the area A at an angle perpendicular to the axis X to intersect the indicia 20, thereby reflecting light off of the indicia 20 and increasing the brightness of the indicia 20, thereby further increasing the contrast between the laser treated portion 20a and the untreated portion 20b. In embodiments, the gemstone 12 may include a surface treatment below the girdle 38 that reflects diffused light through the gemstone, including the pavilion 36 and the culet 18, to further increase contrast and restrict light L from passing through the gemstone 12 below the girdle 38. The surface treatment may be a paint, coating, bruting, or the like that enables maximum contrast between the indicia 20 and a background (e.g., the pavilion 36 or the culet 18) when the indicia 20 is read from about the table 16. The paint or coating may be a white, light-colored enamel, or any other color that reflects diffused light, and may not be a mirrored finish. In embodiments where the surface treatment is bruting, a diamond-grit sandpaper, a diamond, or the like may be used to abrade the surface of the gemstone 12 to increase a surface roughness to increase an opacity of the surface. The surface treatment may not be a polishing or the like that decreases surface roughness of the gemstone 12. In some embodiments, the surface treatment may include cutting or formation of the surface (e.g., cutting the culet), faceting the surface to have a diffusing pattern, or the like.

As shown in FIGS. 4 and 5, the indicia 20 may have a size that is capable of being viewed without specialized equipment, such as a microscope. The indicia 20 may be sized relative to the size of the table 16, as discussed herein, such that an increase in the size of the table 16 results in an increase in the size of the indicia 20. It is further contemplated and possible that the indicia 20 may be any size capable of fitting within the gemstone 12 and being readable, such as, for example, having a width that is equal to or greater than 0.1 mm, or more particularly, 0.25 mm to have an area of 0.25 mm by 0.25 mm. For further example, the indicia 20 may be visible and/or scanable with a magnification in a range between 1× and 1000× magnification, such as by a microscope, or between 1× and 10×, such as by a camera on a cell phone, and more particularly, between 1× and 9× magnification. However, it is contemplated and possible that the indicia 20 may be visible in a range between 1× and 5000×, where the indicia 20 would be microscopic. In further embodiments, the indicia 20 may visible in a range of 1× to 2000×, 1× to 1000×, 1× to 100×, 1× to 50×, 1× to 25×, 1× to 15×, 1× to 8×, 1× to 7×, 1× to 6×, 1× to 5×, 1× to 4×, 1× to 3×, 1× to 2×, or the like. The indicia 20 may be sized and shaped so that the culet 18 has a size and shape equal to or greater than a size and shape of the scanable indicia 20. In embodiments where the table 16 and/or the culet 18 are shaped as a square, the indicia 20 may have a size equal to the size of the culet 18 so that the indicia 20 covers the entire nonilluminated portion 26. The indicia 20 may include a plurality of corners 40, such as four corners, that, when the indicia 20 has a size equal to a size of the culet 18, the corners 40 of the indicia 20 are positioned to be equally spaced out from a plurality of corners 42 of the culet 18, with margins as discussed above. The indicia 20 may be additionally or alternatively sized and shaped so that the table 16 has a size and shape equal to or greater than a size and shape of the indicia 20.

The scanable indicia 20 may be configured to be scanned by the scanning device 14 (FIG. 6), and further configured to transfer information to the scanning device 14. In some embodiments, the scanable indicia 20 may be used to authenticate the gemstone 12, such as, for example, identifying the location that the gemstone 12 was mined, cut, or the like. The gemstone 12 may be attached to an item, such as clothing, accessories, artwork, picture frames, jewelry, or the like, such that the scanable indicia 20 may be used to authenticate the item that the gemstone 12 is attached to. The gemstone 12 may act as a Web 3-enabled asset tag. In such embodiments, the gemstone 12 may be attached to the item with any traditional setting, including a bezel setting. The scanable indicia 20 may additionally or alternatively be used in any traditional manner that a barcode is used, such as, for example, to gain access to an exclusive event or location, to link to a website to view information or send/view a message, or the like.

Figure 6:
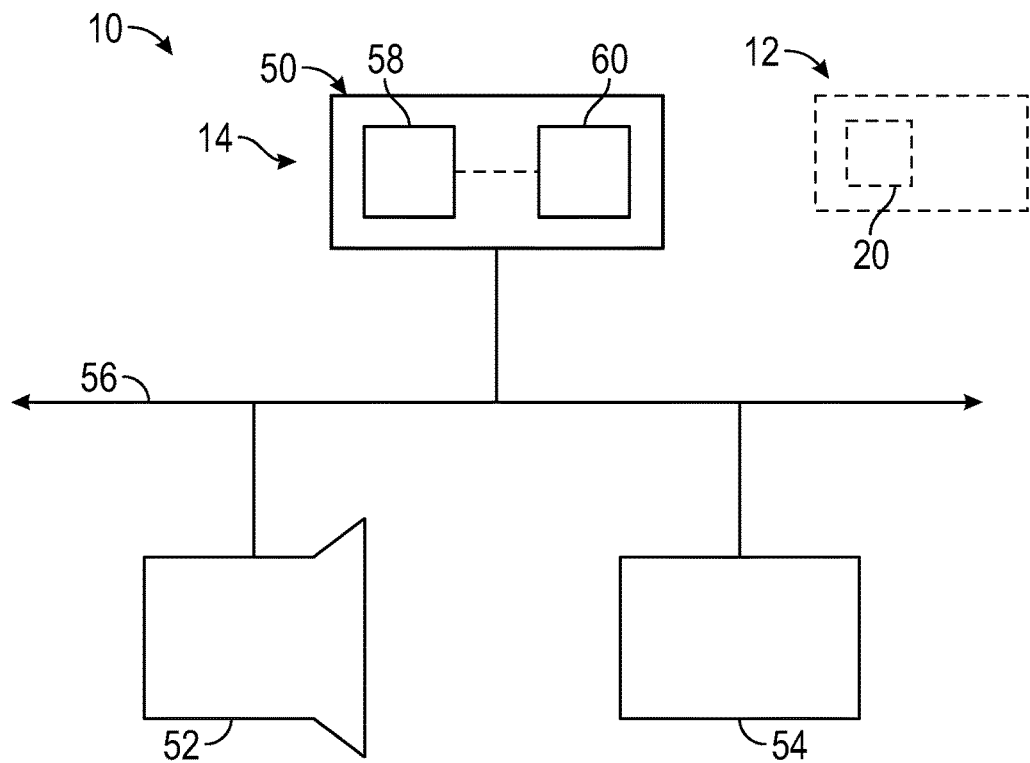
FIG. 6 depicts a scanning device for scanning the scanable indicia of the gemstone of FIG. 3, according to one or more embodiments shown and described herein.

Referring to FIG. 6, the scanning device 14 may include a controller 50, a scanner 52, and a display 54. In embodiments, the scanning device 14 may be a portable device, such as a smartphone, a tablet, a laptop, or the like. However, it is contemplated and possible that the scanning device 14 may be a non-portable device, such as, for example, a desktop. The controller 50, the scanner 52, and the display 54 may be communicatively coupled via a communication path 56 that provides signal interconnectivity between various components and/or modules of the scanning device 14. As such, the controller 50 may include an input/output (I/O) interface configured to provide digital and/or analog inputs and outputs. The I/O interface can be used to transfer information between internal storage and external input and/or output devices (e.g., display). The I/O interface can include associated circuitry or BUS networks to transfer such information. Such a BUS or associated circuitry can allow the components to be communicatively coupled. As used herein, the term "communicatively coupled" means that coupled components are capable of exchanging data signals with one another such as, for example, electrical signals via conductive medium, electromagnetic signals via air, optical signals via optical waveguides, and the like.

The controller 50 includes a processor 58 and a non-transitory electronic memory 60 to which various components are communicatively coupled. In some embodiments, the processor 58 and the non-transitory electronic memory 60 and/or the other components are included within a single device. In other embodiments, the processor 58 and the non-transitory electronic memory 60 and/or the other components may be distributed among multiple devices that are communicatively coupled. The controller 50 includes non-transitory electronic memory 60 that stores a set of machine-readable instructions. The processor 58 executes the machine-readable instructions stored in the non-transitory electronic memory 60. The machine-readable instructions may include software that controls operation of the processor 58 to perform the operations described herein to be performed by the controller 50. The non-transitory electronic memory 60 may include volatile memory and non-volatile memory for storing instructions and data. The non-volatile memory may include solid-state memories, such as NAND flash memory, magnetic and optical storage media, or any other suitable data storage device that retains data when the processor is deactivated or loses electrical power. Non-volatile storage may store compiled and/or interpreted from computer programs created using a variety of programming languages and/or technologies, including, without limitation, and either alone or in combination, Java, C, C++,C#, Objective C, Fortran, Pascal, Java Script, Python, Perl, and PL/SQL. The volatile memory may include static and/or dynamic random-access memory (RAM), flash memory, cache memory, or other memory capable of storing program instructions and data. In short, the non-transitory electronic memory 60 may include RAM, ROM, flash memories, hard drives, or any device capable of storing machine-readable instructions such that the machine-readable instructions can be accessed by the processor 58 to output a control signal for the controller 60 to act on. The non-transitory electronic memory 60 may be implemented as one memory module or a plurality of memory modules.

The processor 58 may be any device capable of executing machine-readable instructions. For example, the processor 58 may be or include an integrated circuit, a microchip, a computer, a microprocessor, a micro-controller, a digital signal processor, a microcomputers, a central processing unit, field programmable gate arrays, programmable logic devices, state machines, logic circuits, analog circuits, digital circuits, or any other devices that manipulate signals (analog or digital) based on computer-executable instructions residing in memory. The non-transitory electronic memory 60 and the processor 58 are coupled to the communication path 56 that provides signal interconnectivity between various components and/or modules of the scanning device 14. Accordingly, the communication path 56 may communicatively couple any number of processors with one another, and allow the modules coupled to the communication path 56 to operate in a distributed computing environment.

The scanner 52 may be configured to scan the scanable indicia 20, and send a signal to the controller 50 indicative of the information of the scanable indicia 20. The scanner 52 may be any device or sensor capable of scanning the scanable indicia 20, such as, for example, a camera, a barcode scanner, or the like. The scanner 52 may be mounted directly to the scanning device 14, or separately connected thereto, such as by a universal serial bus (USB), wireless communication (e.g., WiFi, 3G, 4G, 5G, Bluetooth, etc.) or the like. As discussed above, the information of the scanable indicia 20 may include a web address, information regarding the authenticity and/or origin of the gemstone 12 or related item that the gemstone 12 is attached to, or the like. In embodiments, the information may include a blockchain used for identifying or authenticating the gemstone 12 or related item. In further embodiments, the controller 50 may be configured to identify, via the scanner 52, whether the gemstone 12 is a diamond, or another type of gemstone, such as a sapphire, ruby, emerald, or the like.

The controller 50 may be communicatively coupled to an external device, such as, for example, a server, an internet of things, or the like, to send/receive signals related to the scanable indicia 20. For example, in embodiments where the scanable indicia 20 includes information related to a web address, the controller 50 may communicative with an internet of things to load the web address. The controller 50 may be communicatively coupled to the display 54 to be able to send signals to the display 54 indicative of the information of the scanable indicia 20 received by the scanner 52. When the display 54 receives the signal from the controller 50, the display 54 may be configured to display the information of the scanable indicia 20. The display 54 may be any traditional display for displaying visual information to a user, such as, for example, a screen (e.g., LED, LCD, QLED, etc.). However, it is contemplated and possible that the display 54 may be include non-visual displays of information such as a speaker, a tactile feedback device, or the like.

In another embodiment, the controller 50 may be configured to operate a device for cutting the gemstone 12, such as a laser, an ablation device, or the like. The memory 60 may include instructions that, when executed by the processor 58, cause the cutting device to activate and cut in a desired location or pattern. The cutting patterns may also be saved in the memory 60. Upon activation, the controller 50 may cause a robotic arm, laser light source, ablation device, or the like to be active to properly place the gemstone 12 and make the proper cuts. The controller 50 may be configured to operate the laser light source to form the indicia into the gemstone 12.

Figure 7:
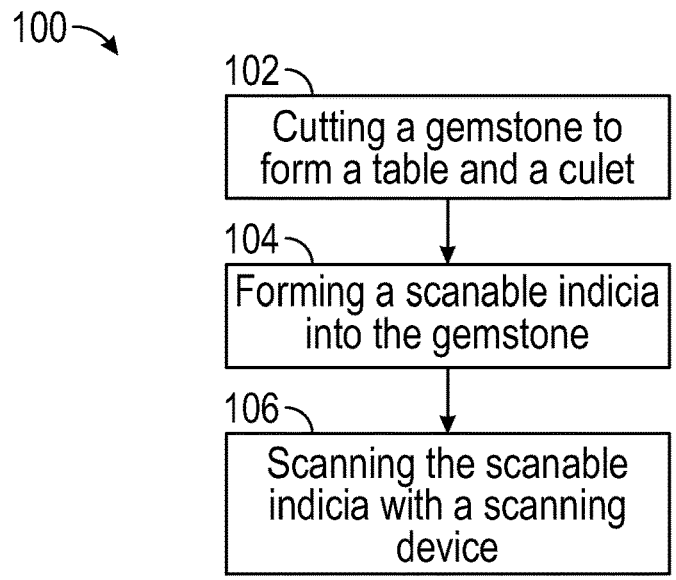
FIG. 7 depicts a flowchart of operation of the scanning device and gemstone of FIG. 6, according to one or more embodiments shown and described herein.

Referring now to FIG. 7, a flowchart of a method 100 of forming and use of the gemstone 12 is depicted. At step 102, the method may include cutting the gemstone 12 to form the table 16 and the culet 18 extending parallel or substantially parallel to the table 16. This may be done, for example, using the controller as described with reference to FIG. 6. The method 100 may further include cutting additional surfaces into the gemstone 12, such as, for example, the pavilion 36, the girdle 38, and the crown 30. The method 100 may further include surface treating one or both of the culet 18 and the pavilion 36 with the surface treatment described above to increase visibility of the indicia 20.

At step 104, the method 100 may include forming the scanable indicia 20 into the gemstone 12. Forming the scanable indicia 20 may include forming the indicia 20 at least partially positioned within the orthographic projection 22 of the area A2 extending along the axis X, and may include laser treating the scanable indicia 20 below a surface 28 of the table 16 between the table 16 and the culet 18. The laser treatment includes aligning two lasers to a position in the gemstone 12 that, individually, cannot form a marking and, when the two lasers meet at the position in the gemstone 12, turn the carbon atoms in the gemstone 12 to graphene, causing the location to appear darker than the rest of the gemstone 12. However, it is contemplated and possible that the scanable indicia 20 may be formed into the gemstone 12 in any known manner, such as, for example, alternative laser methods or chemical etching.

At step 106, the method 100 may include scanning the scanable indicia 20 with the scanning device 14. Scanning the scanable indicia 20 may include aligning the scanner 52 of the scanning device 14 along the axis X of the gemstone 12 to scan the indicia 20. At step 108, once the scanable indicia 20 is scanned, the method 100 may include receiving information related to the scanable indicia 20, and displaying the information related to the scanable indicia 20.

Figure 8:
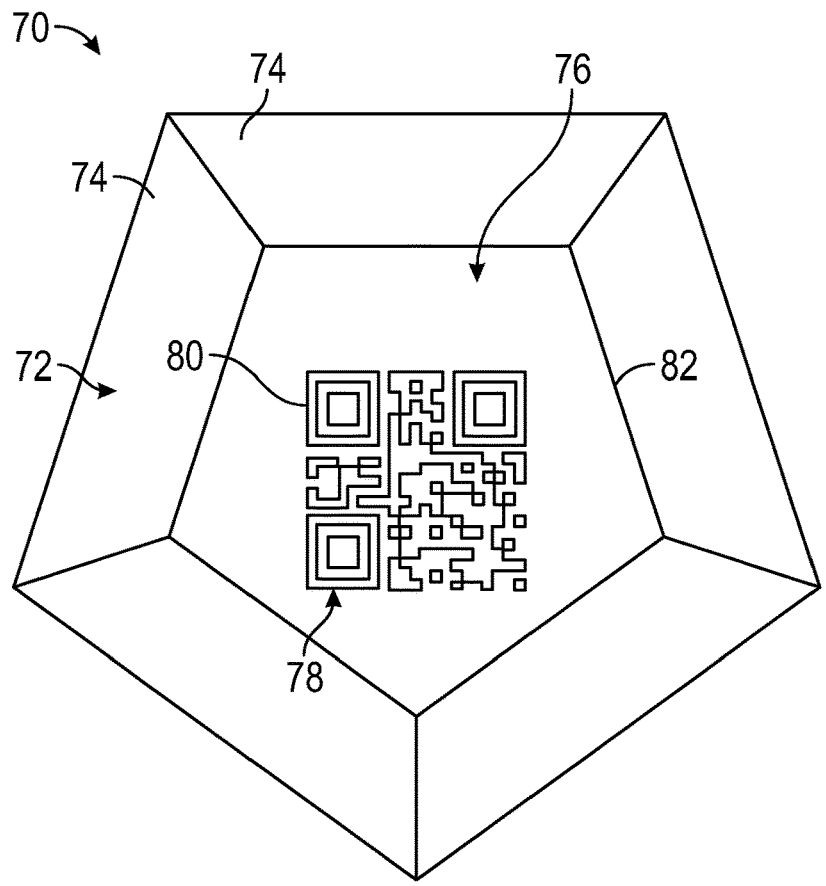
FIG. 8 depicts another gemstone having a crown with five facets, a table having a shape as a pentagon, according to one or more embodiments shown and described herein.

Referring now to FIG. 8, another gemstone 70 is depicted. The gemstone 70 is similar to the gemstone 12 described above, with exception to the details described below. For brevity, like features will not be described again. The gemstone 70 may include a crown 72 that includes five facets 74 such that a table 76 is shaped as a pentagon. A scanable indicia 78 may include a plurality of corners 80, such as four corners, that contact a periphery 82 of the table 76. The periphery 82 may be a plurality of edges where the table 76 intersects the crown 72 to define a profile of the table 76. In embodiments where the table 76 includes more or less facets 74, the corners 80 of the indicia 78 may similarly contact a periphery of the table 76.

Figure 9B:
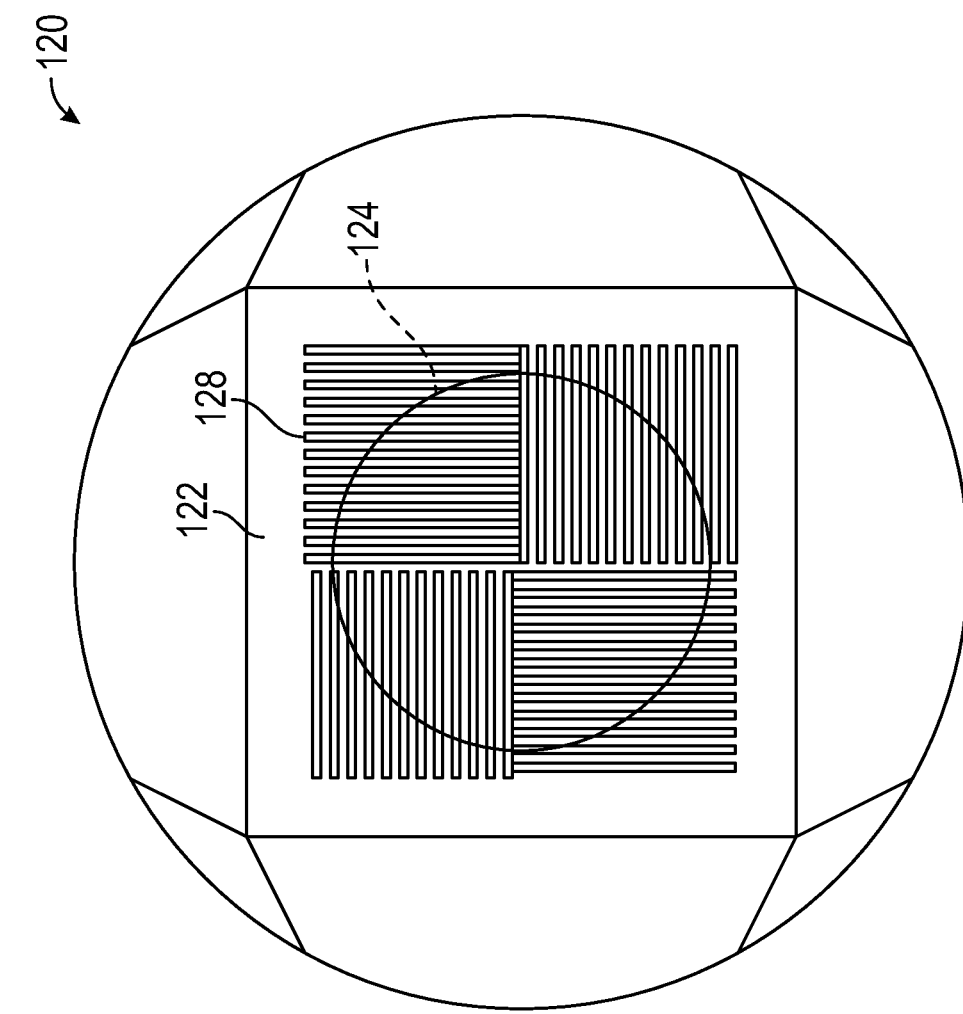
FIGS. 9A and 9B depict side and front views of another gemstone having a thickness of 1.2 mm, according to one or more embodiments shown and described herein.
Figure 9A:
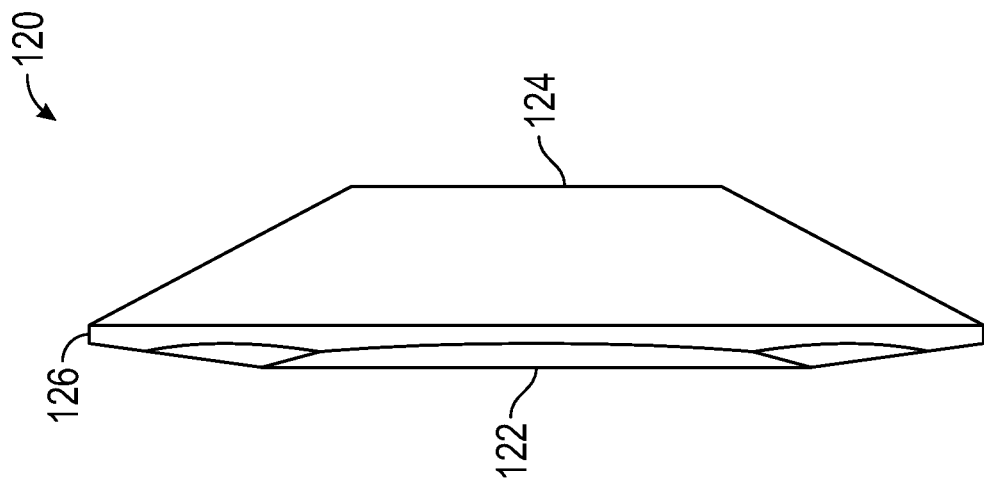

Referring to FIGS. 9A and 9B, in particular embodiments, a gemstone 120 is provided having similar features to the gemstone 12 described above, such as a table 122, a culet 124, a girdle 126, and a scanable indicia 128 similar to the table 16, the culet 18, the girdle 38, and the indicia 20 described above. For brevity, these features and additional similar features will not be described again. As will be described in greater detail below, the gemstone 120 may be formed from a round, brilliant cut diamond (RBC) by removing top and bottom portions from the RBC to decrease a thickness of the gemstone 120 between the table 122 and the culet 124, and to increase a size, or area, of the culet 124. The gemstone 120 may have a diameter of 6 mm at the girdle 126, a thickness of 1.2 mm between the table 122 and the culet 124, measured perpendicularly to each of the table 122 and the culet 124, and the culet 124 may have a diameter or width of 2.538 mm. The indicia 128 may have a width of 2.9 mm measured on a side of the indicia 128, and the table 122 may have a width of 3.68 mm, such that the indicia 128 has a margin of 0.39 mm on each side of the indicia 128, where the margin, as discussed above, is a spacing between a side of the indicia 128 and an adjacent side of the table 122. In other words, the margin may be a spacing between a perimeter of the indicia 128 and a perimeter of the table 122. The size of the culet 124 allows the culet 124 to cover a majority of the indicia 128 when viewed perpendicularly to and through the table 122, allowing the indicia 128 to be visible and scanable.

Figure 10B:
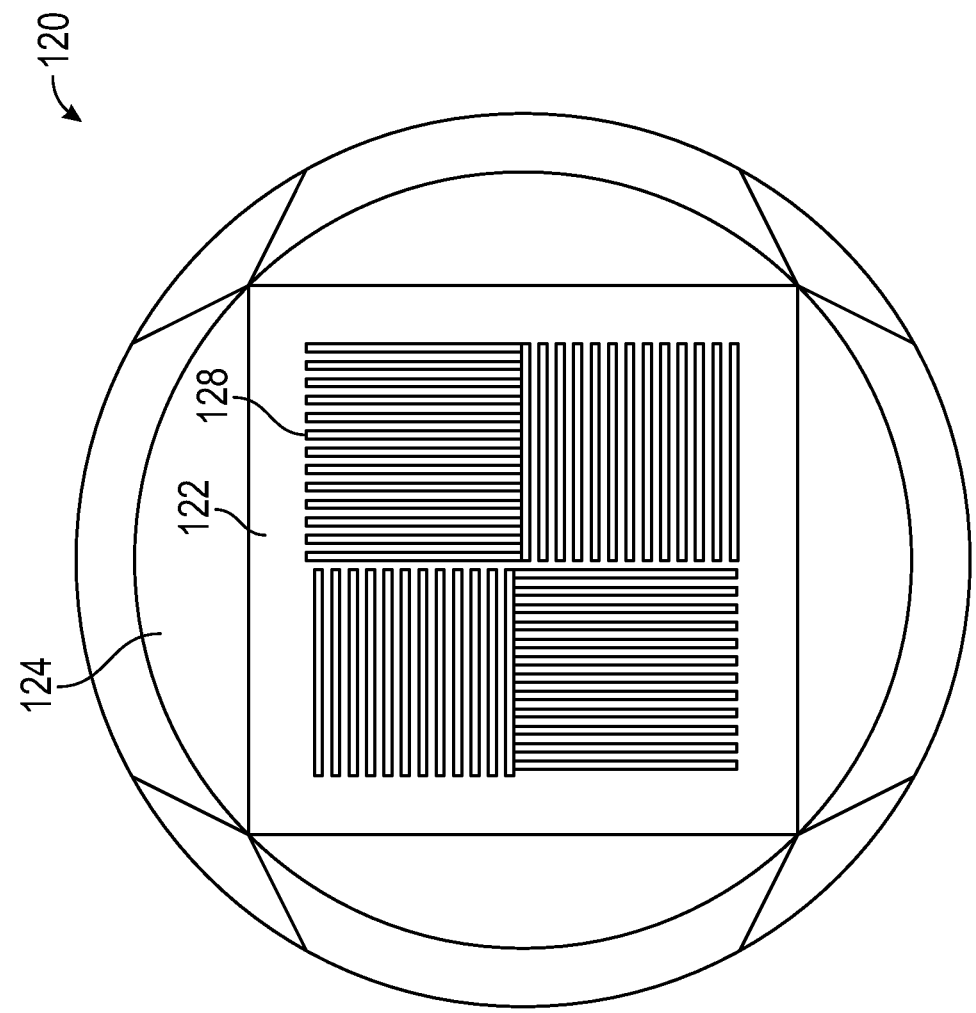
FIGS. 10A and 10B depict side and front views of yet another gemstone having a thickness of 0.5 mm, according to one or more embodiments shown and described herein.
Figure 10A:
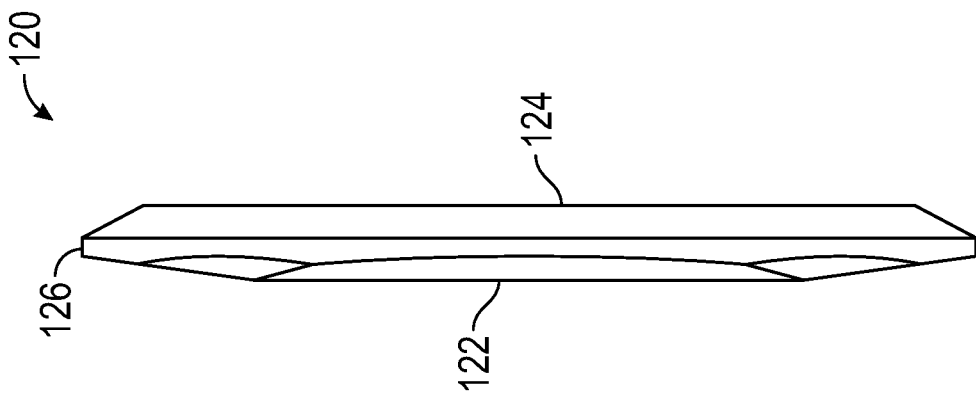

The gemstone 120 may be cut from the RBC to have a lesser thickness, such as shown in FIGS. 10A and 10B. Referring to FIGS. 10A and 10B, the gemstone 120 is depicted having a thickness of 0.5 mm, where additional material is removed from the RBC to reduce the thickness of the gemstone 120. With this thickness, the culet 124 has a diameter of 5.174 mm. This larger culet 124 permits the culet 124 to circumferentially surround the indicia 128 when viewed perpendicularly to and through the table 122, increasing the visibility and scanability of the indicia 128. While FIGS. 9A, 9B, 10A, and 10B depict specific measurements for the gemstone 120, it is contemplated and possible that the measurements may deviate from those specified, and may be larger or smaller while maintaining the same proportions of the gemstone 120, or having a different thickness to increase or decrease a size of the culet 124.

Figure 11:
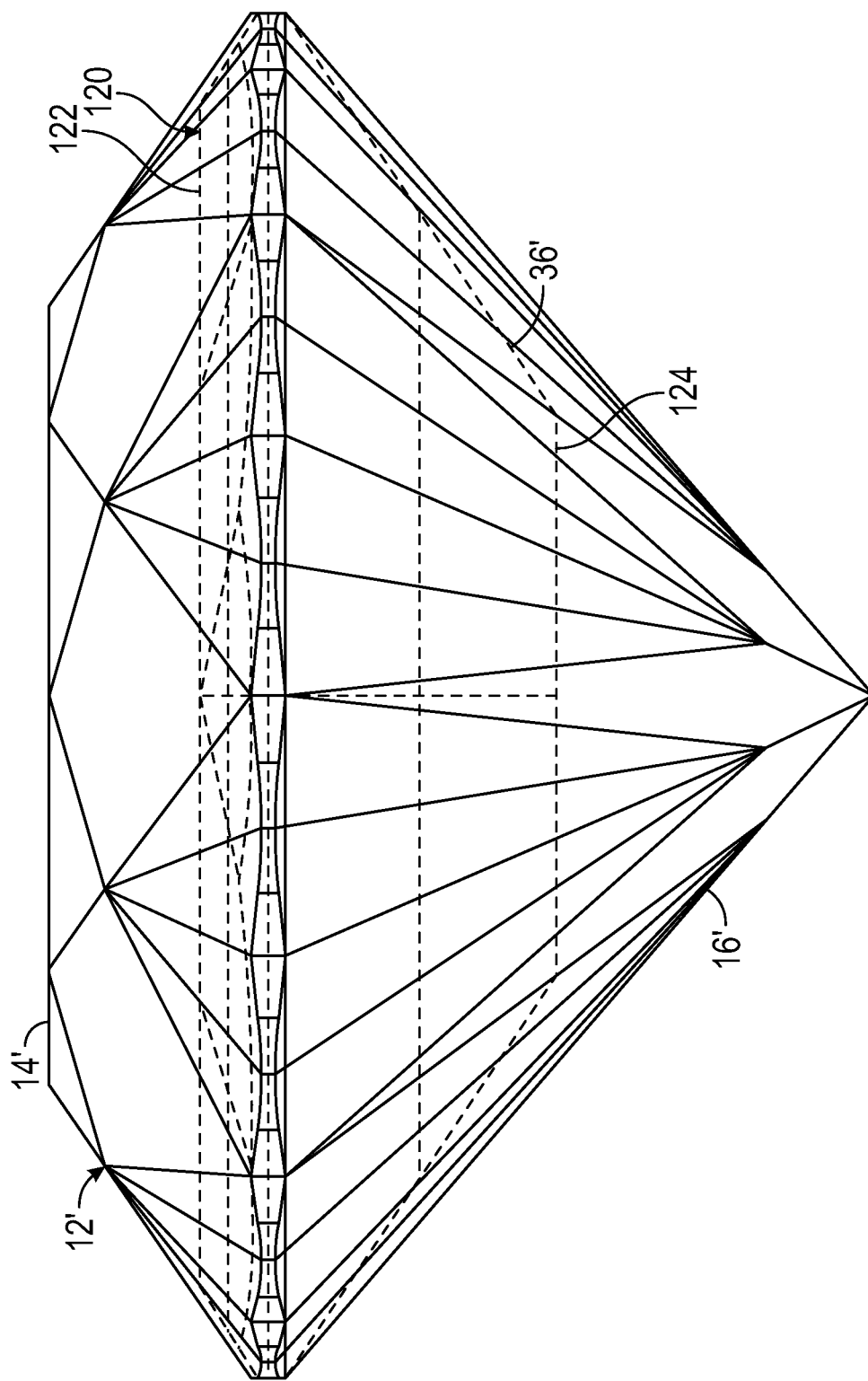
FIG. 11 schematically depicts a round, brilliant cut diamond overlayed with the gemstone of FIG. 9A, according to one or more embodiments shown and described herein.

Referring to FIG. 11, the RBC 12' is depicted in an overlay with the gemstone 120 to show how material is removed from the RBC 12' to form the gemstone 120. It is contemplated and possible that the following method be applicable to forming the gemstones 12, 70 discussed above. To form the gemstone 120 from the RBC 12', a top portion 14' of the RBC 12' may be cut off to increase a size of the table 122 of the gemstone 120, where the top portion 14' may be repurposed to be used as, for example, another gemstone. The crown and the girdle of the RBC 12' may remain uncut during formation of the gemstone 120. A bottom portion 16' of the RBC 12' may additionally be cut off to decrease a thickness of the gemstone 120, thereby increasing a size of the culet 124, where the bottom portion 16' may be repurposed to be used as, for example, another gemstone. The pavilion 36' of the RBC 12' may be left alone, with facets, or may be smoothed down to remove the facets on the pavilion 36'. When cutting the top portion 14' or the bottom portion 16' of the RBC 12' more or less of the top portion 14' and the bottom portion 16' may be taken off of the RBC 12' to increase or decrease a size of the table 122 and the culet 124, respectively.

In some embodiments, an uncut RBC 12' may be used as the gemstone 12, where the indicia 20 is etched into the RBC 12'. An uncut RBC 12' would result in the gemstone 120 having a smaller area of the table 122, and may not include a culet, such that the size of the indicia 20 must be decreased. To decrease a size of the indicia 20, a micro QR code may be used. The uncut RBC 12' may include the paint or coating discussed above on the pavilion of the RBC 12' to increase visibility of the indicia 20.

The current disclosure is further defined in the following clauses:

Clause 1. A gemstone including: a table defining a first area; a culet defining a second area with a size equal to a size of the first area; and a scanable indicia positioned in the gemstone between the table and the culet.

Clause 2. The gemstone according to clause 1, further including a surface treatment that is formed by bruting.

Clause 3. The gemstone according to clauses 1 or 2, wherein the gemstone includes a surface treatment at least partially over the culet that reflects diffused light through the gemstone.

Clause 4. The gemstone according to clause 3, wherein the surface treatment increases the visibility of the scanable indicia.

Clause 5. The gemstone according to any one of clauses 1-4, wherein the scanable indicia is configured to be scanned by a scanning device.

Clause 6. The gemstone according to any one of clauses 1-5, wherein the scanable indicia is a machine readable code including at least one of a QR code, a 2-dimensional code, a 3-dimensional code, and optical character recognition.

Clause 7. The gemstone according to any one of clauses 1-6, wherein the scanable indicia is visible with a magnification in a range between 1× and 1000× magnification.

Clause 8. A gemstone including: a first portion including a table; a second portion including a culet, the second portion is coupled to the first portion; and a scanable indicia is positioned between the table and the culet.

Clause 9. The gemstone according to clause 8, further including a surface treatment on the culet that increases visibility of the scanable indicia.

Clause 10. The gemstone according to clause 9, wherein the surface treatment reflects diffused light through the gemstone.

Clause 11. The gemstone according to any one of clauses 8-10, further including a surface treatment that is formed by bruting.

Clause 12. The gemstone according to any one of clauses 8-11, wherein the scanable indicia is configured to be scanned by a scanning device.

Clause 13. The gemstone according to any one of clauses 8-12, wherein the scanable indicia is a machine readable code including at least one of a QR code, a 2-dimensional code, a 3-dimensional code, and optical character recognition.

Clause 14. The gemstone according to any one of clauses 8-13, wherein the table defines a first area, and the culet defines a second area with a size equal to a size of the first area.

Clause 15. The gemstone according to any one of clauses 8-14, wherein the scanable indicia is formed on a fusing surface of one of the first portion and the second portion, the fusing surface being fused to the other of the first portion and the second portion.

Clause 16. The gemstone according to any one of clauses 8-15, wherein each of the first portion and the second portion are gemstones.

Clause 17. A gemstone including: a table defining a first area; a culet defining a second area with a size equal to a size of the first area; and a scanable indicia positioned in the gemstone between the table and the culet, the scanable indicia includes a plurality of individual data points that each have a width, the scanable indicia is spaced apart from a perimeter of the table to define a margin that is at least 4 times the width of one of the plurality of individual data points, and the scanable indicia has a width that is equal to or greater than 0.1 mm.

Clause 18. The gemstone according to clause 17, wherein the scanable indicia is visible with a magnification in a range between 1× and 40×.

Clause 19. The gemstone according to any one of clauses 17-18, further including a surface treatment that is formed by bruting.

Clause 20. The gemstone according to any one of clauses 17-19, wherein the scanable indicia is a machine readable code including at least one of a QR code, a 2-dimensional code, a 3-dimensional code, and optical character recognition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A gemstone comprising:
    a first portion comprising a table;
    a second portion comprising a culet, the second portion is coupled to the first portion;
    a scanable indicia is positioned between the table and the culet; and
    wherein the scanable indicia is formed on a fusing surface of one of the first portion and the second portion, the fusing surface being fused to the other of the first portion and the second portion.

2. The gemstone of claim 1, further comprising a surface treatment on the culet that increases visibility of the scanable indicia.

3. The gemstone of claim 2, wherein the surface treatment reflects diffused light through the gemstone.

4. The gemstone of claim 1, further comprising a surface treatment that is formed by bruting.

5. The gemstone of claim 1, wherein the scanable indicia is configured to be scanned by a scanning device.

6. The gemstone of claim 1, wherein the scanable indicia is a machine readable code comprising at least one of a QR code, a 2-dimensional code, a 3-dimensional code, and optical character recognition.

7. The gemstone of claim 1, wherein the table defines a first area, and the culet defines a second area with a size equal to a size of the first area.

8. The gemstone of claim 1, wherein each of the first portion and the second portion are gemstones.

* * * * *